April 16, 1963 H. S. FEDER 3,086,083

SWITCHING CIRCUIT

Filed Oct. 23, 1958

INVENTOR
H. S. FEDER
BY R. C. Winter
ATTORNEY

United States Patent Office 3,086,083

Patented Apr. 16, 1963

3,086,083

SWITCHING CIRCUIT

Herbert S. Feder, Fanwood, N.J., assignor to Bell Telephone Laboratories, Incorporated, New York, N.Y., a corporation of New York Filed Oct. 23, 1958, Ser. No. 769,251
11 Claims. (Cl. 179—15)

Figure 1:
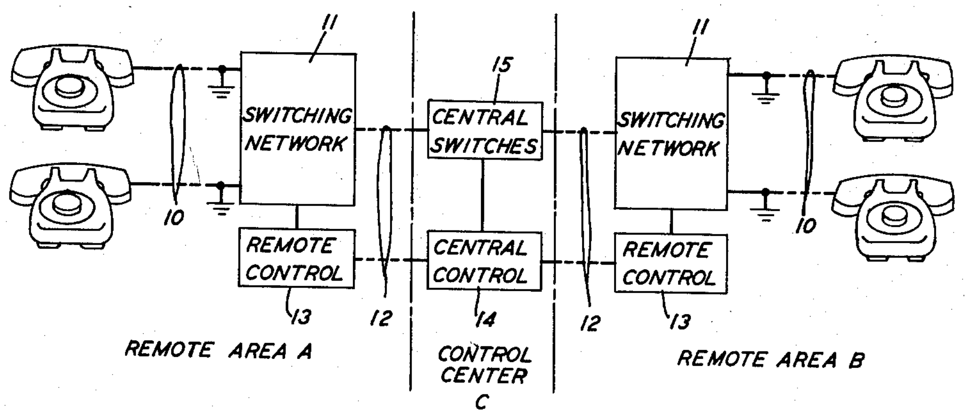

This invention relates to electrical switching circuits and more particularly to electrical gating networks applicable to information handling systems.

It is frequently desirable in various present day high speed information handling systems to provide a gating network having the characteristics of essentially infinite impedance to current flow in either direction when in the nonconducting state, essentially zero impedance in both directions when in the conducting state, electronic operation to enable switching at high speeds, and isolation of the current transmission path from the gate control circuitry.

Such a network could find utility, for example, in various electrical and telephone systems where a plurality of conductors, or lines, are sampled cyclically or time shared to permit the simultaneous exchange of information between communicating pairs of such lines over a common communication link. This practice requires that in successive short time intervals each pair of terminals in communication be assigned a frequently recurring discrete time slot during which information may be sampled and received. In the interval between appearances of the time slot assigned to a particular pair of terminals, the common communication link is available to other pairs of communicating terminals. By sampling at a sufficiently rapid rate, proper filtering in transmission, and rapid transfer of the sampled information to and from the common communication link, an accurate reproduction of the information transmitted from one terminal of the pair may be formed at the other terminal of the pair.

This technique may be utilized, for example, in telephone systems where a plurality of subscriber stations may be interconnected via a common communication link, thereby conserving expensive transmission facilities. A system of this type is described in a Patent 2,957,949 by D. B. James, J. D. Johannesen, M. Karnaugh and W. A. Malthaner, issued October 25, 1960.

Gating networks suitable for this application are known in the art, as illustrated for example by that disclosed in J. D. Johannesen, P. B. Myers and J. E. Schwenker Patent 2,899,570, issued August 11, 1959. In this instance a two-transistor bilateral transmission gate, controlled by application of signals between the base and emitter of each transistor, is indicated. Such a connection permits the desired isolation of the control signals from the transmission line.

It is also known in the art that a junction type transistor having at least three successively arranged junctions may be controlled to provide the gating functions described hereinbefore. The latter device, however, is difficult to realize in practice in that attachment of the control electrode to one of the intermediate junctions is not easily attained. Also, a single transistor of this PNPN type affords no means for isolating control signals from the line circuits where such signals are detrimental to the information being transmitted between lines in communication.

While this invention will be described with reference to telephone systems, and more particularly with reference to a telephone system of the type described in the aforementioned James et al. patent, it is to be understood that this invention is not limited to telephone applications alone. Other applications may be in the field of computers, telegraph communication systems, data transmission systems, or any other systems where high speed gating circuits are required.

It is a general object of this invention to provide an improved high speed gating circuit.

More specifically, it is an object of this invention to provide an improved high speed gating circuit capable of transmitting information from a number of lines to a common communication link.

It is a further object of this invention to provide a high speed gating circuit capable of presenting effectively zero impedance to current flow in either direction when in a conducting state and essentially infinite impedance to current flow in either direction when in the nonconducting state.

It is a further object of this invention to provide a high speed gating circuit wherein the control signals are effectively isolated from the signal paths.

It is a further object of this invention to provide a high speed gating circuit comprising easily fabricated semiconductive elements.

These and other objects of this invention are attained in one specific illustrative embodiment wherein a line switching network comprises a plurality of semi-conductive diode gates. Each gate circuit, in accordance with my invention, comprises a pair of PNPN diode units connected in parallel between each line circuit and a common link. The diode units are connected in opposite polarity in the signal path so as to provide bilateral transmission characteristics for the entire gate.

In accordance with one aspect of this invention, a series path including the diode units is completed through a secondary winding of a transformer coupling to a control pulse source. Thus the control signal is applied external to the PNPN units and no internal connection is required to effect control.

In accordance with another aspect of this invention, an inductance is connected between the subscriber line and each of the PNPN units and serves a dual purpose: viz., isolation of the control signals from the line, and resonant transfer of signals in either direction through the gate.

Specifically, in embodiments of my invention, a control pulse is applied to the pulse transformer secondary with an initial peak sufficient to break down the two semiconductive units in series and place them in their low impedance states for passage of information signals in either direction through the units in parallel. Upon removal of the control signal at the end of the desired period for transfer of information signals through the gating circuit, the semiconductive units are restored to their high impedance state, thereby blocking further passage of signals between the associated line circuit and common link.

The gate thus provides extremely low impedance to the resonant transfer of energy in the signal path, each semiconductive unit and its related inductance forming one of two parallel paths for such transfer so that the gate in its enabled state presents an impedance in the signal path equivalent to one-half of the impedance presented by one of the semiconductive units alone in its low impedance state. The semiconductive units in their enabled, low impedance state, also afford a more attractive path for the control signal in the series circuit through the control pulse secondary winding than the high impedance presented by the inductance connected in series between the line circuit and each of the semiconductor units. In this fashion the control signal is effectively isolated from the line circuit.

Accordingly, the unique connection of PNPN units in parallel signal paths and a series control path, attains the desired rapid transition in a gate from essentially infinite impedance to current flow in either direction to effectively zero impedance to current flow in either direction, while isolating the control signal from the signal path.

It is a feature of this invention that a pair of semiconductive diode units, each defining at least three junctions between zones of opposite conductivity types, be connected in parallel in a bilateral signal transmission path and that a control signal be applied to means connected in series with the semiconductive diode units.

It is another feature of this invention that transformer means be included in the series control path of the semiconductive diode units for inductive coupling of control signals from a pulse source to the diode units.

It is still another feature of this invention that end zones of opposite conductivity types in the semiconductive diode units be connected to opposite ends of the control transformer secondary winding to complete the series control signal path through the semiconductive diode units.

It is a further feature of this invention that inductance means be connected between the information signal path and each of the semiconductive diode units to facilitate the resonant transfer of information in the signal transmission path and to block control signals from the signal transmission path.

Figure 2:
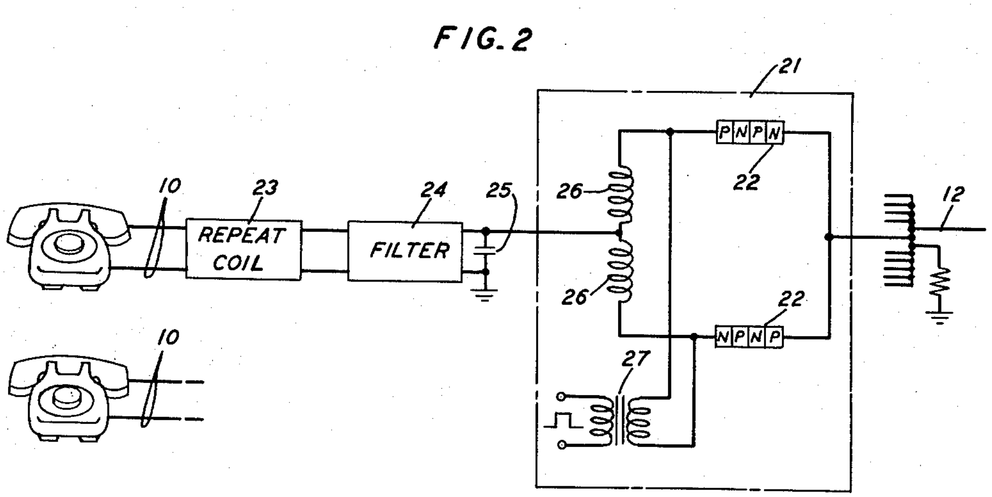

A complete understanding of these and other features of this invention may be gained from consideration of the following detailed description, together with the accompanying drawing, in which:

FIG. 1 is a schematic representation in block diagram form of a telephone system in which gating circuits in accordance with this invention may be employed; and FIG. 2 is a schematic representation of one illustrative embodiment of a gating circuit in accordance with this invention that may be employed in the telephone system of FIG. 1.

Turning now to the drawing, there is depicted in FIG. 1 a telephone system of the type disclosed in the James et al. patent cited hereinbefore, wherein circuits in accordance with my invention may advantageously be employed. In this system a plurality of subscriber lines 10 are selectively connected by a switching network 11 in remote areas A and B to a switching and control center C over common transmission links 12. Equipment in central control 14 then is operated, for example, in accordance with signals from a subscriber line 10 in remote area A to complete a connection through the central switches 15 to a called subscriber's line 10 in the same remote area A, in remote area B, or over trunks to other remote areas and foreign telephone systems.

Advantageously, the system may be operated on a time division multiplex basis in which each subscriber line 10 desiring service is assigned a particular sampling period or time slot in a recurrent cycle of time slots. Upon each occurrence of a time slot assigned to a particular calling subscriber's line 10 a sample of information is transmitted from his telephone through the switching network 11 to the common transmission link 12 and through the same or a similar switching network 11 to the called subscriber's line 10. Considering that the called subscriber may be located in another remote area or a foreign telephone system, such signal samples are transmitted over the common link 12 to the central switches 15, from whence they are disseminated to the desired terminal point.

Information as to the condition of a subscriber line 10 and as to whether it is idle, busy on an established connection, or desiring to have a connection established to it, is obtained by the remote area control 13 connected between the remote switching network 11 and the central control 14 by the control lead of the common communication link 12. The remote area control 13 contains a scanning circuit which detects particular conditions of the lines 10 during designated sampling periods and transmits control signals to line gating circuits in the switching network 11 upon receipt of directive signals from the central control 14. The resultant connections and disconnections of the line gating circuits in the switching network 11 occur rapidly and in a selected sequence for precisely timed intervals during which signal samples are transmitted between the subscriber lines 10 and the common communication link 12.

One specific illustrative embodiment of the switching network in accordance with this invention is depicted in FIG. 2 and comprises a plurality of line gates 21 including semiconductive diode units 22 and circuitry for the application of the control signals to the line gates. The particular elements required in the subscriber lines 10 and the common communication link 12 are also shown, to indicate particular advantages of the gating circuit in accordance with this invention. Thus the subscriber lines 10 comprise a repeat coil 23 and a low pass filter 24, terminated in a storage capacitance 25. The lines 10 are arranged for unbalanced operation, with one side of the low pass filter connected to ground.

The opposite side of the filter 24 is connected in common to one end of each of the semiconductive diode units 22 in the line gate 21. The common communication link 12, in turn, is connected in common to the opposite end of each of the semiconductive diode units 22. Thus it is seen that the semiconductive diode units are connected in parallel in the information signal path.

An inductor 26 is connected in series with each of the semiconductive diode units 22 between the filter 24 and the common link 12. These inductors serve a dual purpose, which will be described in detail hereinafter.

Control signals for the semiconductive units 22 advantageously are applied through transformer 27. The secondary winding of the transformer 27 is so connected with the semiconductive units 22 as to form a closed loop. Advantageously, the connections of the control circuit to the line gate 21 are intermediate the semiconductive units 22 and the respective series-connected inductors 26.

The semiconductive units 22 each comprise a plurality of zones of opposite conductivity types forming at least three junctions, such elements being referred to in the art as PNPN units and disclosed, for example, in W. Shockley Patent 2,855,524, issued October 13, 1953. Such a device exhibits at least one high impedance junction to current flow in either direction through the device regardless of the direction in which the diode is poled. The PNPN device will maintain its high impedance as long as the voltage across its terminals remains below a predetermined threshold value. In order that the device be set in a low impedance state, a voltage which exceeds the predetermined threshold value must be applied across the terminals of the device. Once the low impedance is attained, it will remain in that state provided that a second threshold value which is substantially below the first threshold value and near zero volts is maintained across the terminals of the PNPN diode. Removal of this second threshold level, which is often termed the interruption of the sustaining current, will revert the PNPN diode to its original high impedance state. Thus the PNPN units are well suited to perform applicant's objective of essentially infinite impedance when in a high impedance state and essentially zero impedance when in a low impedance state. The units are connected in opposite polarity in the information signal path such that signals transmitted in either direction through the line gate 21 will normally encounter at least two reverse-biased junctions in the parallel-connected semiconductive units 22.

Upon the application of a control pulse of sufficient magnitude through the transformer 27, the semiconductive units 22 are simultaneously reduced to their low impedance states in accordance with the operating characteristics of the PNPN diode unit, as known in the art. With the semiconductive units in their low impedance state, a control signal current is circulated in the loop consisting of the two semiconductive units and the secondary winding of the transformer 27. The inductors 26 which are, in effect, connected across the secondary winding of the transformer 27, provide a high impedance to the passage of the control signal over the information signal line, thereby effectively confining the control signal to the closed loop path in the line gate 21 itself.

The line gate 21 in the enabled state provides a low impedance path for the transfer of information in either direction between the line circuit 10 and the common communication link 12. As each inductor 26 and the associated semiconductive unit 22 form one of two parallel paths for such information signal transfer, the inductors 26 may also serve as resonant transfer elements. Such resonant transfer comprises the transfer of energy stored in the line circuit capacitance 25 through the line gate 21 in its low impedance state and to a similar storage capacitance in the common communication link 12. In order to assure transfer of a complete sample from one storage capacitance to the other without loss, the resonant transfer circuit, as described in detail in Patent 2,936,337 by W. D. Lewis, issued May 10, 1960, necessarily includes an inductor in series with the storage capacitance. The inductors 26 thus may serve this resonant transfer function as well as provide the control signal blocking impedance, as described hereinbefore.

In applications in which resonant transfer of information through the gate is not required, the inductors 26 advantageously may be closely coupled such that the impedance which the arrangement presents to current flowing in the signal path through the line gate 21 is extremely low. With this modification the gate circuit may be utilized in applications where a relatively fast-acting gate or switch is required.

What is disclosed, therefore, is a fast-acting transmission gate comprising available semiconductive diode units in a unique circuit arrangement which permits pulse control for extremely low impedance bilateral transmission with rapid transfer to a high impedance blocking condition and isolation of the control signals in the gate.

It is to be understood that the above-described arrangements are illustrative of the application of the principles of the invention. Numerous other arrangements may be devised by those skilled in the art without departing from the spirit and scope of this invention.

What is claimed is:

1. A switching arrangement comprising a pair of PNPN semiconductive devices, switching control means, first means connecting said switching control means between a zone of one type of semiconductive material in one of said devices and a zone of the opposite type of semiconductive material in the other of said devices, a first transmission line, second means connecting said first transmission line to said zone of one type in said one device and to said zone of the opposite type in said other device, a second transmission line and third means connecting said second transmission line to each of said devices.

2. A switching arrangement in accordance with claim 1 wherein said second connecting means comprises inductance means having equal portions connected between said first transmission line and each of said PNPN semiconductive devices.

3. In a time division telephone system a switching network comprising a plurality of individual lines, a single line, a gate circuit connecting each of said plurality of lines to said single line, each of said gate circuits comprising a pair of semiconductive devices each having at least four zones of alternately opposite types of semiconductive material, means connecting said devices in series, inductance means connected between one end zone of each of said devices and a corresponding one of said individual lines, the other end zone of each of said devices being connected to said single line, and means for applying signal pulses selectively to said devices through said series connection to selectively control the completion and inhibition of signal paths from said individual lines to said single line.

4. In a bilateral transmission gate interconnecting two signal terminals, a first circuit interconnecting said terminals and comprising a signal polarity sensitive PNPN semiconductive diode poled in a first direction, a second circuit also interconnecting said terminals, said second circuit being separate from said first circuit and also comprising a signal polarity sensitive PNPN semiconductive diode poled in a second direction, said PNPN semiconductive diodes each being set in a normally high impedance state for controlling the signal conduction through said first and second circuits, and control means for causing both of said semiconductive devices to simultaneously assume a low impedance state.

5. A gating circuit in accordance with claim 4 wherein both said first and second circuits include an inductance in series with said semiconductive diodes.

6. A gating circuit in accordance with claim 5 wherein said control means comprises circuit means connected to the junction of the semiconductor diode and the inductance in both said first and second circuits for causing a bias current to flow therethrough and thereby break down said semiconductor diodes to their low impedance state.

7. In a bilateral transmission gate interconnecting two signal terminals, a parallel circuit having two branches connected between said terminals with one branch of said parallel circuit comprising an inductor in series with a PNPN diode poled in one direction and the other branch comprising an inductor in series with a PNPN diode poled in an opposite direction, said two branches being effective to provide a normally high impedance between said terminals, means for applying a control signal between the junction of the inductor and the PNPN diode in each of said branches whereby each diode is forward-biased for establishing a low impedance between said terminals.

8. In a gating circuit connecting two portions of a signal transmission path, a pair of parallel connected semiconductive devices having both a high and a low impedance state, said pair of devices being set normally in said high impedance state to transmission signals of either polarity, means direct-current connecting said parallel connected pair of semiconductive devices in a series circuit with said two portions of said signal transmission path, a two-terminal control signal path comprising both of said semiconductive devices connected in a series circuit between said control path terminals, and means for applying a pulse to said control signal path for simultaneously setting said semiconductive devices in a low impedance state whereby transmission signals of either polarity are solely confined to conduction through one low impedance semiconductive device.

9. The combination of claim 8 wherein said means for connecting said parallel connected pair of semiconductive devices in series with said two portions of signal transmission path comprises a pair of inductive elements with one each of said elements series connected between one each of said semiconductive devices and one portion of said signal transmission path for resonant transfer of signals from said transmission path through said semiconductive devices.

10. In a bilateral transmission gate interconnecting two signal terminals, a first circuit comprising a single two-electrode semiconductive device, said semiconductive device set in a normally high impedance state to control conduction in said first circuit, said first circuit further comprising a first inductor connected between one of said terminals and said semiconductive device, a second circuit separate from said first circuit and comprising a single two-electrode semiconductive device, said last-mentioned semiconductive device set in a normally high impedance state to control conduction in said second circuit, said second circuit further comprising a second inductor connected between said one of said terminals and said last-mentioned semiconductive device, means for applying control pulses to said semiconductive devices to simultaneously cause all of said semiconductive devices in said transmission gate to assume a low impedance state, and connecting means comprising the remaining terminal of said signal terminals for completing a closed series path for said control pulses, said closed series path including said control pulse applying means and said semiconductive devices.

11. In a bilateral transmission gate interconnecting two signal terminals, a first and a second circuit connected in parallel for controlling transmission therein of a signal simultaneously in parallel between one of said terminals and the remaining one of said signal terminals, said first circuit comprising a single signal polarity sensitive two-electrode semiconductive device poled in a first direction, said second circuit being separate from said first circuit and also comprising a single signal polarity sensitive two-electrode semiconductive device poled in a second direction, said semiconductive devices each being set in a normally high impedance state for preventing signal conduction in parallel through said first and second circuits, and a single two-terminal control pulse applying circuit having each of its terminals exclusively connected to one electrode of a different one of said semiconductive devices for applying a control pulse of polarity to simultaneously cause all of said semiconductive devices in said transmission gate to assume a low impedance state.

References Cited in the file of this patent

UNITED STATES PATENTS

| | | |
|---|---|---|
| 2,659,774 | Barney | Nov. 17, 1953 |
| 2,662,123 | Koenig | Dec. 8, 1953 |
| 2,691,073 | Lowman | Oct. 5, 1954 |
| 2,851,617 | Walker | Sept. 9, 1958 |
| 2,936,338 | James et al. | May 10, 1960 |